United States Patent
Kuebler et al.

(10) Patent No.: US 7,431,398 B2
(45) Date of Patent: Oct. 7, 2008

(54) ADJUSTING MECHANISM FOR A REAR SEAT OF A VEHICLE

(75) Inventors: Markus-Claus Kuebler, Schoemberg (DE); Joachim Paschek, Illingen (DE); Claus Baumgart, Ludwigsburg (DE); Jan Fischer, Bietigheim-Bissingen (DE); Joerg Dittus, Freiberg a.N (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 496 days.

(21) Appl. No.: 10/937,897

(22) Filed: Sep. 10, 2004

(65) Prior Publication Data

US 2005/0173959 A1    Aug. 11, 2005

(30) Foreign Application Priority Data

Sep. 10, 2003 (DE) .................. 103 41 643

(51) Int. Cl.
*B60N 2/04* (2006.01)
(52) U.S. Cl. ........................................ 297/342
(58) Field of Classification Search ............... 297/342, 297/341, 343, 317, 322, 316, 318; 296/65.01, 296/65.16
See application file for complete search history.

(56) References Cited

U.S. PATENT DOCUMENTS

| | | | | |
|---|---|---|---|---|
| 1,414,637 A | * | 5/1922 | Gell | 297/343 |
| 1,888,787 A | * | 11/1932 | Carlson | 297/342 |
| 2,021,120 A | * | 11/1935 | Wilkins | 297/317 |
| 2,064,536 A | | 12/1936 | Grinnel | |
| 2,324,902 A | * | 7/1943 | Benzick et al. | 297/316 |
| 2,547,446 A | * | 4/1951 | Dean | 297/322 |
| 4,452,486 A | * | 6/1984 | Zapf et al. | 297/343 |
| 4,518,201 A | | 5/1985 | Wahlmann et al. | |
| 4,813,721 A | | 3/1989 | Mora | |
| 5,454,624 A | * | 10/1995 | Anglade et al. | 297/354.13 |

FOREIGN PATENT DOCUMENTS

| | | |
|---|---|---|
| DE | 32 06 293 | 9/1983 |
| DE | 35 31 992 A1 | 4/1986 |
| DE | 35 27 152 | 3/1987 |
| DE | 40 31 568 | 4/1992 |
| DE | 44 02 978 | 1/1996 |
| EP | 0 211 248 A2 | 2/1987 |
| EP | 1 216 878 A1 | 6/2002 |
| FR | 2 285 260 | 9/1974 |
| FR | 2 524 285 A | 10/1983 |

OTHER PUBLICATIONS

European Search Report Dated Nov. 10, 2005 With English Translation of Relevant Portion (Four (4) Pages).

* cited by examiner

*Primary Examiner*—Milton Nelson, Jr.
(74) *Attorney, Agent, or Firm*—Crowell & Moring LLP

(57) ABSTRACT

An adjusting mechanism for a rearward vehicle seat has an adjusting gearing including a controlling kinematic lever which, on the one side, is restrictedly guided in a frame element and, on the other side, is restrictedly guided in a stationary anchor plate. By displacing the seat, the adjusting gearing permits the linear displacing of the seat part and the swivelling of the seat backrest about a fixed locking point at the vehicle body.

14 Claims, 4 Drawing Sheets

ADJUSTING MECHANISM FOR A REAR SEAT OF A VEHICLE

BACKGROUND AND SUMMARY OF THE INVENTION

This application claims the priority of German Application No. DE 103 41 643.9-14 filed Sep. 10, 2003, the disclosure of which is expressly incorporated by reference herein.

The invention relates to an adjusting mechanism for a rear seat of a vehicle. Certain preferred embodiments of the invention relate to an adjusting mechanism for a rear seat of a vehicle for adjusting a seat backrest held in a locking point of a vehicle body and a seat part connected with this seat backrest.

From German Patent Document DE 32 06 293 (corresponding U.S. Pat. No. 4,518,201), a vehicle seat is known which, by means of its seat backrest and its seat part, can be displaced into a forward and backward position, the seat backrest being arranged to be swivellable and adjustable with respect to the vehicle body by means of a control arm. The seat part is connected with another control arm, by means of which a swivelling and a vertical raising of the seat part takes place.

It is an object of certain preferred embodiments of the invention to provide a displaceable seat, particularly a rear seat for a motor vehicle, which can be adjusted into several positions while the rear backrest is locked in a body-shell-fixed manner.

According to the invention, this object is achieved by providing an adjusting mechanism for a rear seat of a vehicle for adjusting a seat backrest held in a locking point of a vehicle body and a seat part connected with this seat backrest, wherein the adjusting device comprises an adjusting gearing with a kinematic lever connected with the seat backrest by way of a fastening element, the kinematic lever being restrictedly guided on one side in a stationary anchor plate of a seat frame and on another side in a displaceable frame element of the seat.

Important advantages achieved by means of certain preferred embodiments of the invention consist of the fact that, despite a swivelling movement of the seat backrest about a body-shell-fixed locking mechanism, the seat part nevertheless carries out a linear movement on a plane. This is advantageously achieved in that the adjusting mechanism comprises an adjusting gearing having a kinematic lever which is connected with the seat backrest and which, on the one side, is restrictedly guided in a stationary anchor plate of the seat and, on the other side, in a displaceable frame element of the seat. As a result, a movement control of the seat backrest and of the seat part is achieved in a mutually independent manner in that the seat backrest can swivel about a radius, and the seat part is linearly displaced without the adjustment of a different height of the seat part.

According to certain preferred embodiments of the invention, for the restricted guidance of the kinematic lever in the stationary anchor plate, a curved guiding slot for a guide pin is provided at the kinematic lever, and the stationary kinematic lever is swivellably about an axis by way of a pivot pin connected with the frame element. By means of mutually overlapping guide slots in the kinematic lever as well as in the frame element, by way of an engaging fastening element of the seat backrest, the kinematic lever can be adjusted with respect to the latter and with the latter. As a result, the different movement courses, such as the linear movement of the seat part and the swivelling movement of the seat backrest, can advantageously be separated from one another during a displacement operation of the seat.

For this purpose, according to certain preferred embodiments of the invention, the guide slots are set at an angle with respect to one another in a rearward seat end position, the guide slot in the frame element being aligned approximately in a vertical plane, and, in the seat end position, the additional guide slot in the kinematic lever being arranged approximately in a horizontal plane.

As a result, by way of the adjusting gearing, the vehicle seat can be continuously displaced from a rearward seat position to a forward seat position such that, by means of the kinematic lever, the seat can be linearly moved in the direction of the arrow, and the seat backrest is constructed to be swivellable in the direction of the arrow about the stationary locking point of the seat backrest. A correlating movement of the elements of the adjusting gearing is thereby achieved without any occurrence of a blocking during the displacement of the seat. An end position of the displaced seat, according to certain preferred embodiments of the invention, whether it is toward the front or toward the rear—viewed in the driving direction of the vehicle—has been reached, when, in the rearward seat end position, the guide pin of the kinematic lever at the rearward end—viewed in the displacement direction of the seat—is arranged in the curved guide slot of the stationary anchor plate, and simultaneously the fastening element of the seat backrest is arranged in the lower end of the approximately vertically aligned guide slot of the frame element and in the forward end of the guide slot of the kinematic lever, and the guide pin as well as the fastening element in the forward end seat position respectively is arranged in a position at the opposed ends of the guide slots.

An embodiment of the invention is illustrated in the drawings and will be described in detail in the following.

Other objects, advantages and novel features of the present invention will become apparent from the following detailed description of the invention when considered in conjunction with the accompanying drawings.

DETAILED DESCRIPTION OF THE DRAWINGS

Figure 1:
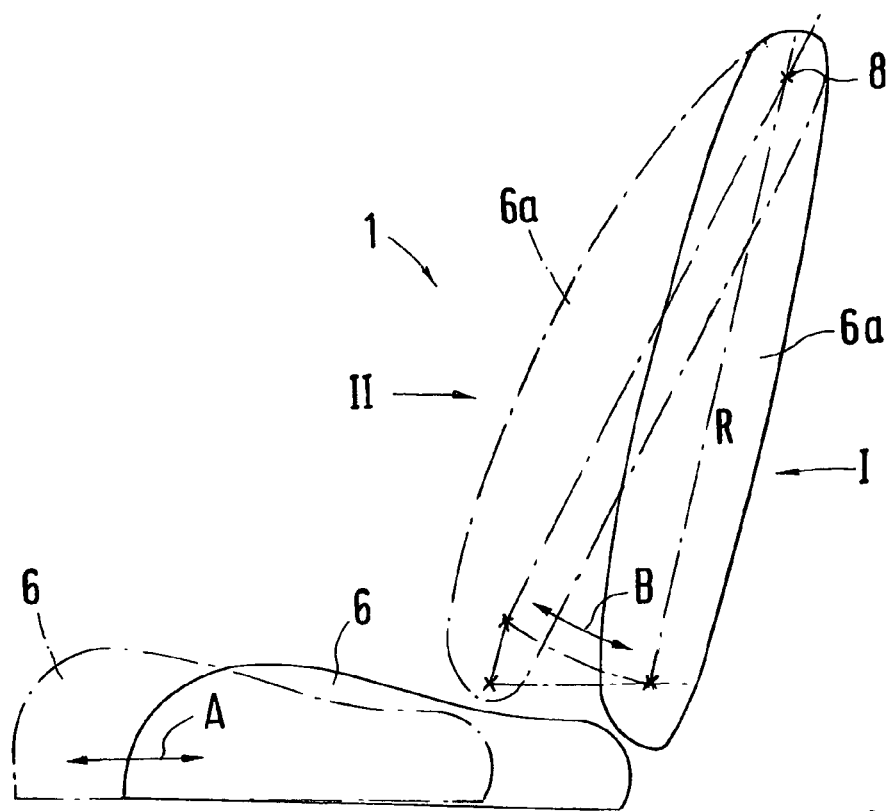
FIG. 1 is a basic diagram of a vehicle seat in a forward (dash-dotted lines) and in a rearward position (solid lines)—viewed with respect to the driving direction of the vehicle—in the vehicle, constructed according to certain preferred embodiments of the invention.

The adjusting mechanism for a vehicle seat 1 comprises essentially an adjusting gearing 2 with a kinematic lever 5 interacting with a frame element 3 and a stationary anchor plate 4. By way of this adjusting gearing 2, the seat 1 can be displaced from a rearward seat end position I into a forward seat end position II and intermediate positions—with respect to the driving direction F—of the vehicle. During this seat displacement, the seat part 6 moves linearly in the direction of the arrow A, and the seat backrest 6a swivels about a fixed locking point 8 at the vehicle body in the direction of the arrow B about a radius R, which direction of the arrow B originates from the locking point 8.

By way of a pivot pin 9, the kinematic lever 5 of the adjusting gearing 2 is connected with the frame element 3 which is connected with the seat part 6 or with an upper rail. Furthermore, the kinematic lever 5 is swivellably connected by way of fastening elements 10 of the seat backrest 6a, which fastening elements 10 have a cross bar 11 of a seat backrest frame 12 at the end side.

A restricted guidance in the stationary anchor plate 4 of the seat 1 takes place by means of a guide pin 13 which engages in a curved guide slot 14. Additional guide slots 15, 16 in the frame element 3 and in the kinematic lever 5 overlap one another, and the fastening element 10 is arranged in these additional guide slots 15, 16 in a displaceable or restrictedly guided manner.

Figure 3:
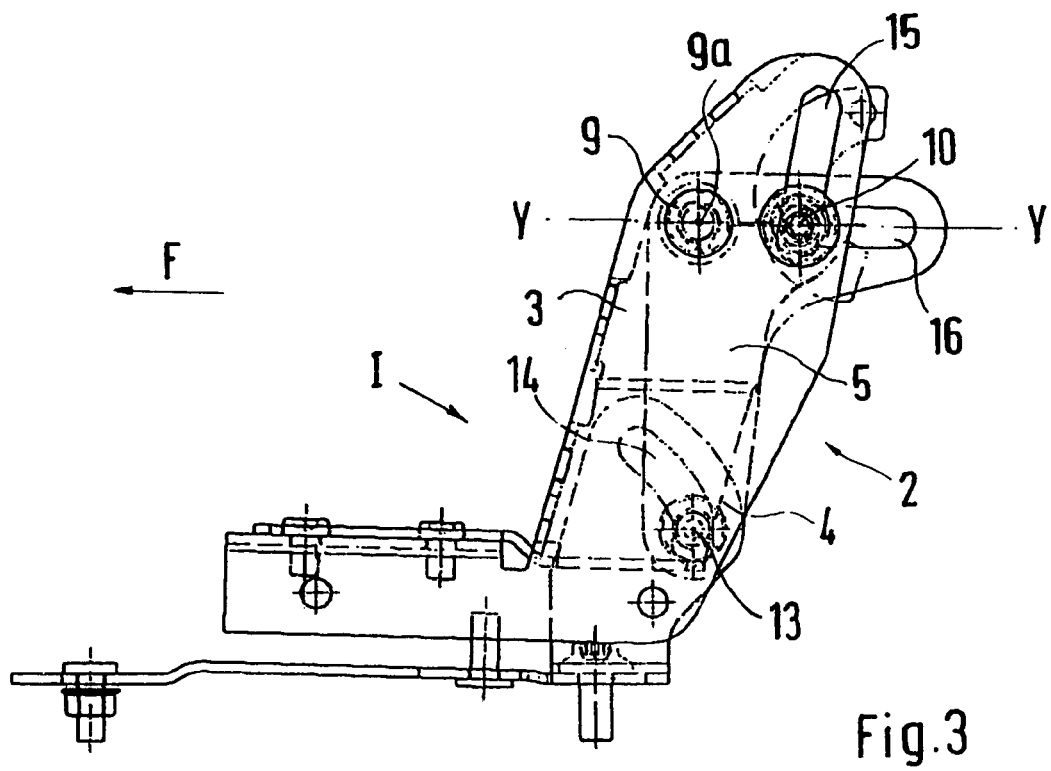
FIG. 3 is a schematic side view showing the rearward position of the vehicle seat.
Figure 4:
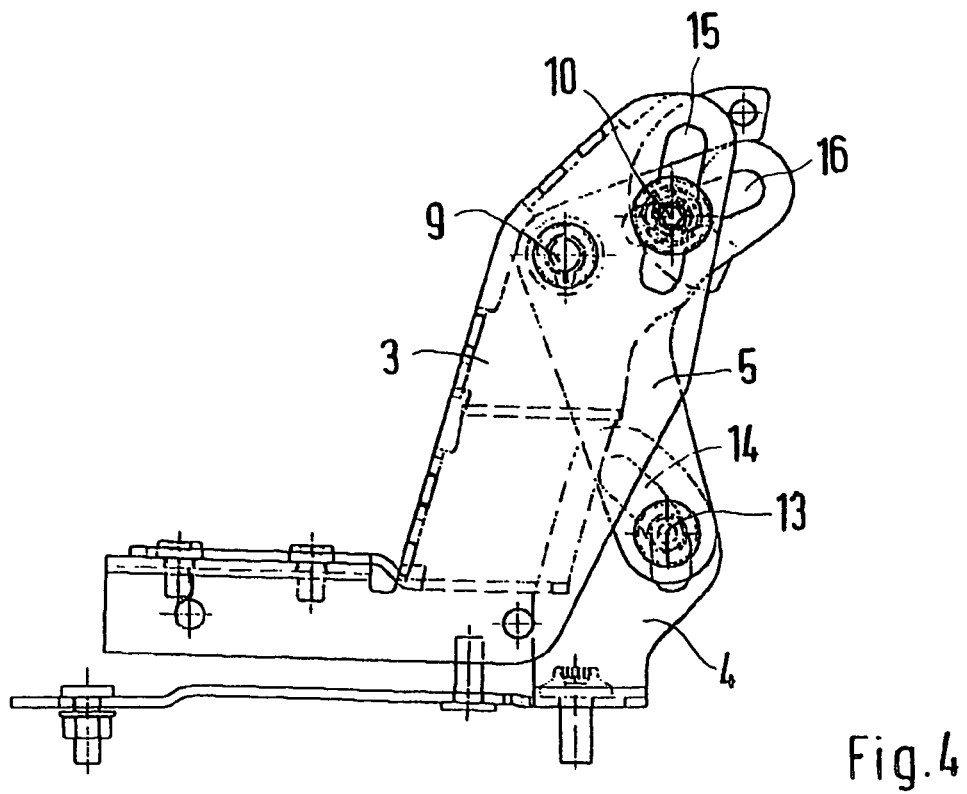
FIG. 4 is a schematic side view showing the center position of the vehicle seat.
Figure 6:
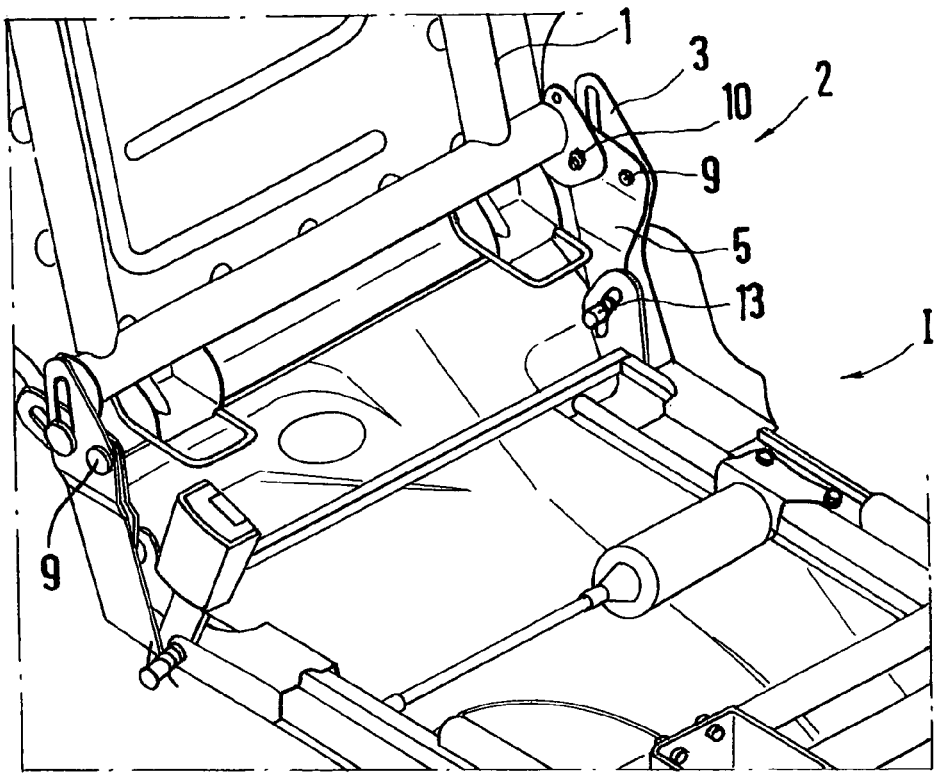
FIG. 6 is a diagrammatic representation of the rearward position of the vehicle seat.
Figure 7:
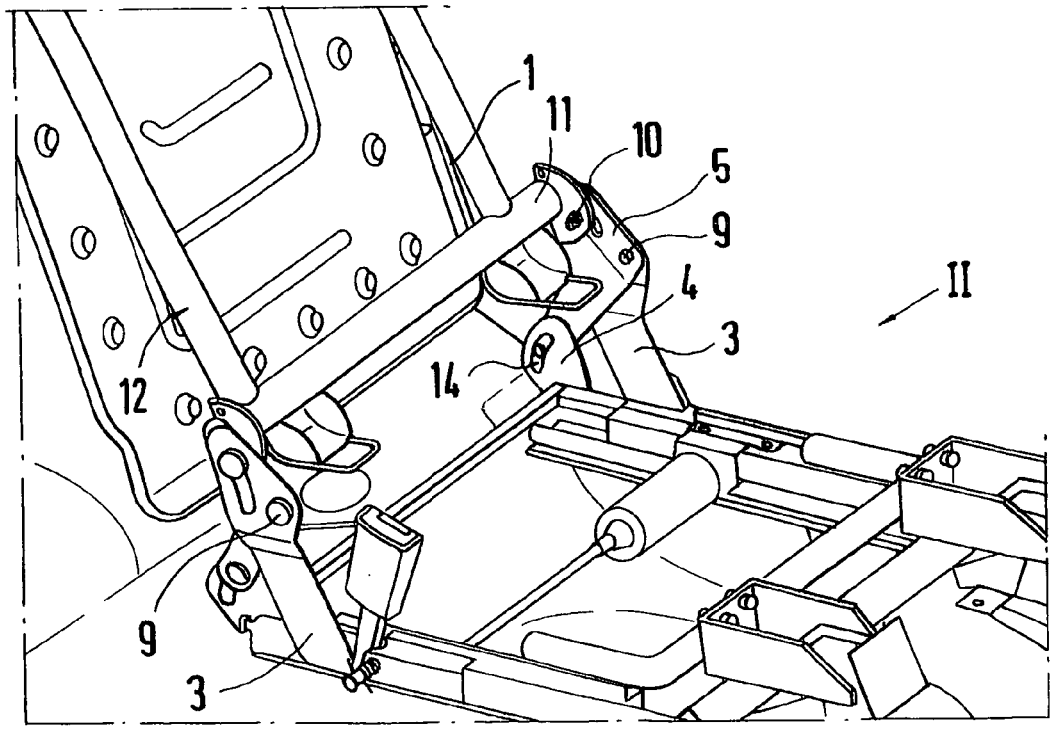
FIG. 7 is a diagrammatic representation of the forward position of the vehicle seat.

Thus, in the rearward seat end position I according to FIGS. 3 and 6, the guide pin 13—viewed with respect to the driving direction F of the vehicle—is arranged at the lower end of the curved guide slot 14, in which case the fastening element 10 of the seat backrest 6a is also arranged at the lower end of the guide slot 15 and at the forward end—viewed with respect to the driving direction F of the vehicle—of the guide slot 16.

The guide slot 15 in the frame element 3 is constructed as a longitudinal slot and extends approximately in a vertical plane X-X, whereas the additional guide slot 16 is also constructed as a longitudinal slot and, in the rearward seat end position I, extends approximately in a horizontal plane Y-Y. In contrast, the guide slot 14 in the anchor plate 4 is constructed in a curved manner and has the shape of a circular segment.

Figure 5:
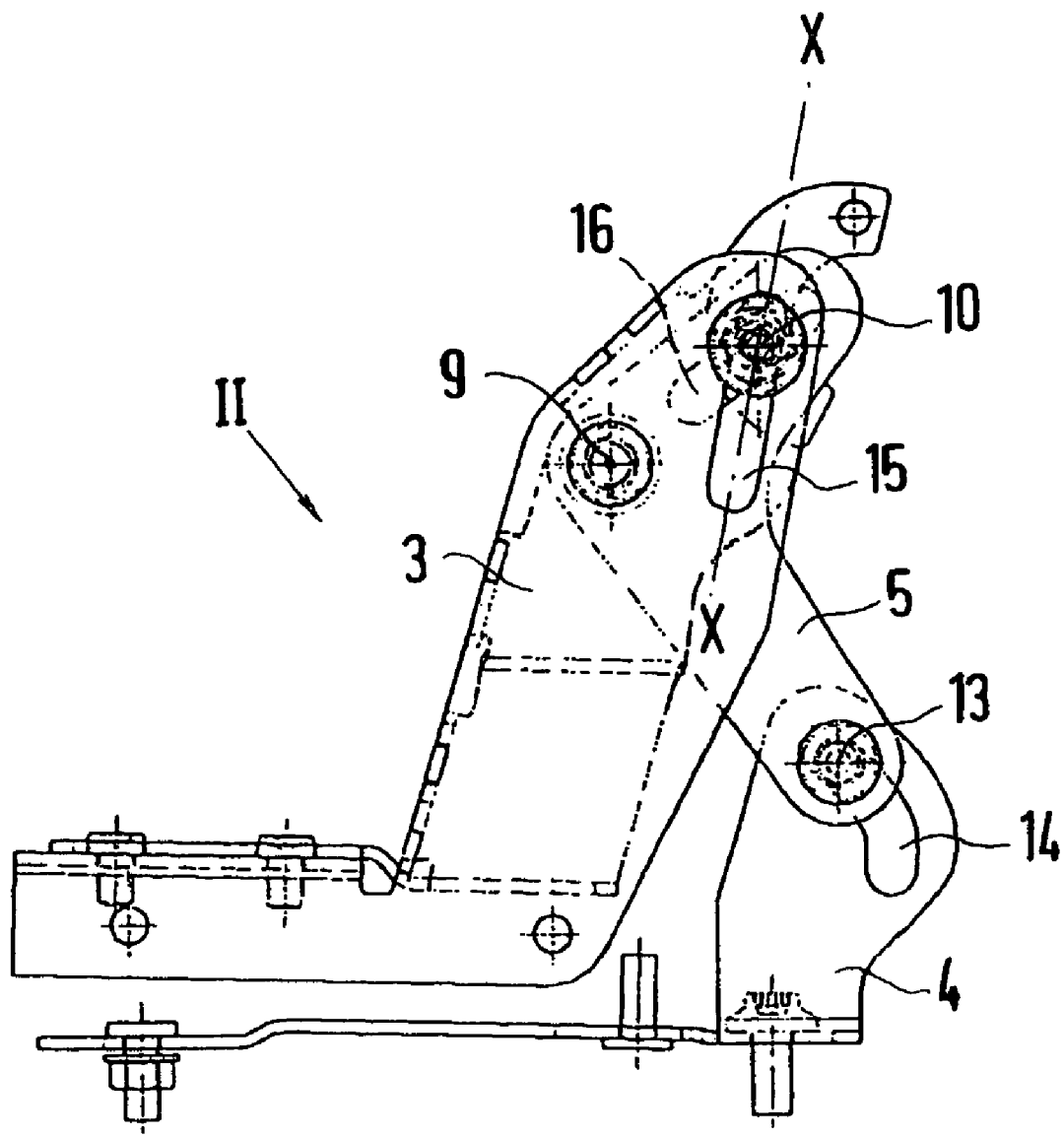
FIG. 5 is a schematic side view showing the forward position of the vehicle seat.

When the vehicle seat 1 is adjusted from position I (FIG. 3) to position II (FIG. 5), the seat is slid or moved in the direction of the arrow A toward the front in the driving direction F. So that the seat part 6 can be linearly swivelled and the seat backrest 6a can be swivelled with the radius R, the kinematic lever 5 virtually leads the seat backrest 6a into an inclined position, in which case the seat part 6 carries out a straight movement, as illustrated in detail in the basic diagram of FIG. 1.

Figure 2:
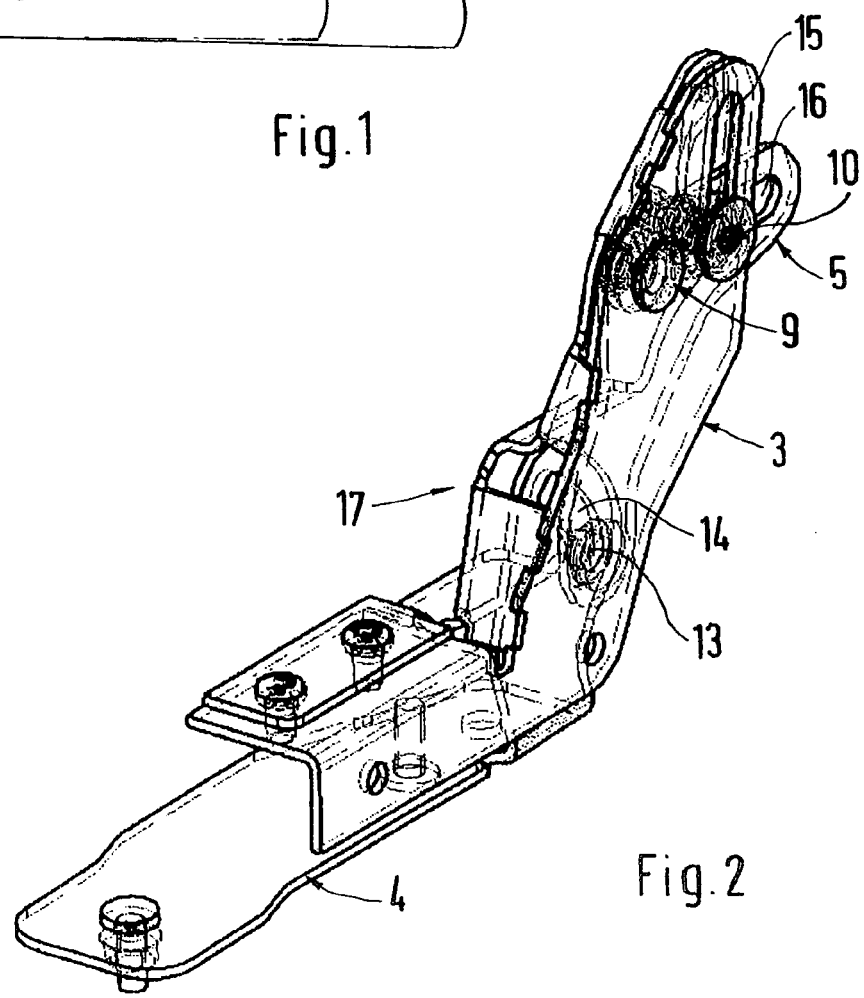
FIG. 2 is an enlarged representation of a frame element with an integrated kinematic lever and a stationary anchor plate of the adjusting gearing for the vehicle seat of FIG. 1.

For the flat support of the kinematic lever 5 on both sides, the latter is arranged in a kinematic housing 17 according to FIG. 2, the anchor plate 4 projecting into housing 17 by means of the curved slot 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Adjusting mechanism in a vehicle seat for adjusting a backrest of the seat held in a locking point of a vehicle body and a seat part connected with the seat backrest, comprising an adjusting gearing with a kinematic lever connectable with the seat backrest via a fastening element, the kinematic lever being restrictedly guidable on one side in a stationary anchor plate of a seat frame and on another side in a displaceable frame element of the vehicle seat, wherein the kinematic lever is swivellably connectable by way of a pivot pin about an axis with the frame element and, by way of mutually overlapping guide slots in the kinematic lever as well as in the frame element, the kinematic lever is adjustable with respect to the seat backrest and the frame element.

2. Mechanism according to claim 1, wherein the vehicle seat can be displaced by way of the adjusting gearing from a rearward seat end position to a forward seat end position such that the seat can be linearly moved in a horizontal direction by way of the kinematic lever, and the seat backrest is constructed to be swivellable in a direction about a stationary locking point of the seat backrest.

3. Mechanism according to claim 1, wherein in a rearward seat end position, a guide pin at a rearward end of the kinematic lever—viewed in a displacement direction of the seat— is arranged in a curved guide slot of the stationary anchor plate, and simultaneously the fastening element of the seat backrest is arranged in a lower end of one of the mutually overlapping guide slots configured as an approximately vertically aligned guide slot of the frame element and in a forward end of the guide slot—viewed in the displacement direction of the seat—of the kinematic lever, and wherein the guide pin as well as the fastening element in a forward end seat position respectively are arranged in a position at respective opposed ends of the guide slots.

4. Mechanism according to claim 1, wherein the kinematic lever and the stationary anchor plate are arranged in a housing of the frame element.

5. Mechanism according to claim 4, wherein the vehicle seat can be displaced by way of the adjusting gearing from a rearward seat end position to a forward seat end position such that the seat can be linearly moved in a horizontal direction by way of the kinematic lever, and the seat backrest is constructed to be swivellable in a direction about a stationary locking point of the seat backrest.

6. Mechanism according to claim 4, wherein in a rearward seat end position, a guide pin at a rearward end of the kinematic lever—viewed in a displacement direction of the seat— is arranged in a curved guide slot of the stationary anchor plate, and simultaneously the fastening element of the seat backrest is arranged in said guide slot of the frame element and in a forward end of another said guide slot—viewed in the displacement direction of the seat—of the kinematic lever, and wherein the guide pin as well as the fastening element in a forward end seat position respectively are arranged in a position at respective opposed ends of the guide slots.

7. Mechanism according to claim 1, wherein the mutually overlapping guide slots, in a rearward seat end position are set at an angle with respect to one another, the guide slot in the frame element being aligned approximately in a vertical plane and, in the rearward seat end position, and the guide slot in the kinematic lever being arranged approximately in a horizontal plane.

8. Mechanism according to claim 7, wherein the kinematic lever and the stationary anchor plate are arranged in a housing of the frame element.

9. Mechanism according to claim 7, wherein the vehicle seat can be displaced by way of the adjusting gearing from the rearward seat end position to a forward seat end position such that the seat can be linearly moved in a horizontal direction by way of the kinematic lever, and the seat backrest is constructed to be swivellable in a direction about a stationary locking point of the seat backrest.

10. Mechanism according to claim 7, wherein in the rearward seat end position, a guide pin at a rearward end of the kinematic lever—viewed in a displacement direction of the seat—is arranged in a curved guide slot of the stationary anchor plate, and simultaneously the fastening element of the seat backrest is arranged in a lower end of said approximately vertically said guide slot of the frame element and in a forward end of said guide slot—viewed in the displacement direction of the seat—of the kinematic lever, and wherein the guide pin as well as the fastening element in a forward end seat position respectively are arranged in a position at respective opposed ends of the guide slots.

11. A vehicle seat assembly comprising:
a seat backrest which in use is held in a locking point of a vehicle body,
a displaceable seat frame element,
a stationary anchor plate which in use is fixed in position in a vehicle body, and
an adjusting device operable to automatically adjust the position of the seat backrest as a function of the position of the displaceable seat frame element, wherein the adjusting device includes:
a kinematic lever, and
a fastening element connecting the kinematic lever with the seat backrest,
the kinematic lever movement being restrictedly guided on one side in the stationary anchor plate and on another side in the displaceable seat frame element, and
the kinematic lever is swivellably connectable by way of a pivot pin about an axis with the frame element and, by way of mutually overlapping guide slots in the kinematic lever as well as in the frame element, is adjustable with respect to the seat backrest and the frame element.

12. An assembly according to claim 11, wherein a curved guide slot for a guide pin is provided in the stationary anchor plate for the restricted guidance of the kinematic lever in the stationary anchor plate.

13. An assembly according to claim 11, wherein the mutually overlapping guide slots, in a rearward seat end position are set at an angle with respect to one another, the guide slot in the frame element being aligned approximately in a vertical plane and, in the rearward seat end position of the seat, the guide slot in the kinematic lever being arranged approximately in a horizontal plane.

14. An assembly according to claim 13, wherein the kinematic lever and the stationary anchor plate are arranged in a housing of the frame element.

* * * * *